United States Patent
Jalla (10) Patent No.: US 10,501,095 B2
(45) Date of Patent: Dec. 10, 2019

(54) POWER SYSTEM FOR A LOCOMOTIVE

(71) Applicant: Progress Rail Locomotive Inc., LaGrange, IL (US)

(72) Inventor: Madan M. Jalla, Woodridge, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 252 days.

(21) Appl. No.: 15/584,319

(22) Filed: May 2, 2017

(65) Prior Publication Data
US 2018/0319409 A1 Nov. 8, 2018

(51) Int. Cl.
| | |
|---|---|
| *B61C 17/12* | (2006.01) |
| *B60L 1/00* | (2006.01) |
| *H02P 6/04* | (2016.01) |
| *H02P 8/40* | (2006.01) |
| *H02P 6/10* | (2006.01) |
| *B60L 50/10* | (2019.01) |
| *H02P 3/12* | (2006.01) |

(52) U.S. Cl.
CPC .............. *B61C 17/12* (2013.01); *B60L 1/003* (2013.01); *B60L 50/10* (2019.02); *H02P 3/12* (2013.01); *H02P 6/04* (2013.01); *H02P 6/10* (2013.01); *H02P 8/40* (2013.01); *B60L 2200/26* (2013.01)

(58) Field of Classification Search
CPC .... B61C 3/00; B61C 3/02; B61C 9/38; B61C 15/00; B61C 15/02; B61C 15/14; B61C 17/00; B61C 17/06; B61C 17/12
See application file for complete search history.

(56) References Cited

U.S. PATENT DOCUMENTS

| | | | |
|---|---|---|---|
| 7,479,757 B2 | 1/2009 | Ahmad | |
| 7,532,960 B2 | 5/2009 | Kumar | |
| 9,024,563 B2 | 5/2015 | Bünte et al. | |
| 2013/0333635 A1* | 12/2013 | Geradts | B60L 7/14 |
| | | | 123/2 |

FOREIGN PATENT DOCUMENTS

| | | |
|---|---|---|
| CN | 104158242 | 11/2014 |
| CN | 105774569 | 7/2016 |
| CN | 205468595 | 8/2016 |
| DE | 102009054785 | 1/2011 |
| DE | 102011075509 | 11/2012 |

* cited by examiner

*Primary Examiner* — Robert J McCarry, Jr.

(57) ABSTRACT

A power system for a locomotive includes a dynamic brake (DB) grid, at least one chopper circuit, and a controller. The locomotive includes at least one traction motor to power one or more loads during a braking of the locomotive. The DB grid includes at least one resistor bank and is configured to dissipate at least a portion of the power generated by the traction motor. The chopper circuit includes a three-phase inverter module, and selectively disables an electrical communication between the resistor bank and the traction motor. The controller is coupled to the chopper circuit and the loads. The controller determines a magnitude of the loads, and controls the chopper circuit to disable an electrical communication between the resistor bank and the traction motor for a predetermined duration to control a portion of the power dissipated by the DB grid to meet the magnitude of the loads.

18 Claims, 8 Drawing Sheets

POWER SYSTEM FOR A LOCOMOTIVE

TECHNICAL FIELD

The present disclosure relates to a power system for a diesel electric locomotive. More particularly, the present disclosure relates to a chopper circuit for the power system that may dynamically adapt to varying power requirements of the diesel electric locomotive in a dynamic brake mode of the diesel electric locomotive.

BACKGROUND

Locomotives generally use an internal combustion engine to drive a power source, such as a generator or an alternator, to propel a train. Such generators or alternators may convert a mechanical energy of the internal combustion engine into electrical energy (or power) and energize a set of traction motors of the locomotive. The traction motors in turn drive a set of locomotive wheels, thereby enabling locomotive propulsion.

Trains, including passenger trains typically require electrical power for powering various applications that may be unrelated to locomotive propulsion. For example, some locomotives may include an auxiliary power locomotive (APL) system that may provide electrical power for heating, cooling, ambient lighting, and energizing various electrical outlets of the locomotives, and a head end power (HEP) system that may be configured to provide electrical power for heating, cooling, ambient lighting, and energizing various electrical outlets for the railcars of the trains.

During locomotive retardation or braking, a dynamic brake mode may be applied in such locomotives. In a dynamic brake mode, regenerative energy is generally generated by the traction motors. Such regenerative energy may be dumped into one or more dynamic brake (DB) grids of the braking system, and/or the regenerative energy may be consumed by the HEP system and APL system. However, because a resistance provided by the DB grid is generally of a fixed value, a voltage developed across an associated DC link may drop as power dissipated across the DB grid drops. As a result, the alternator may require to support a steady DC link voltage, and may thus need the internal combustion engine to provide supplementary power, leading to a consumption of fuel in the dynamic braking mode.

German Patent DE102009054785A1 relates to a braking chopper that has a three-phase power inverter module that is linked at the direct current side with connectors of an intermediate voltage circuit and is linked at the alternative current side with resistances. The power inverter module has three bridge sections with two electrical semiconductor switches, whose connection points form the alternative current sided connections of the power inverter. Free ends of the resistances are linked together.

SUMMARY OF THE INVENTION

In one aspect, a power system for a locomotive is disclosed. The locomotive includes at least one traction motor configured to power one or more loads during a braking of the locomotive. The power system includes a dynamic brake (DB) grid, at least one chopper circuit, and a controller. The DB grid includes at least one resistor bank, and is configured to dissipate at least a portion of the power generated by the at least one traction motor. The at least one chopper circuit includes a three-phase inverter module, and is configured to selectively disable an electrical communication between the at least one resistor bank and the at least one traction motor. The controller is coupled to the at least one chopper circuit and the one or more loads. The controller is configured to determine a magnitude of the one or more loads. The controller is further configured to control the at least one chopper circuit to disable the electrical communication between the at least one resistor bank and the at least one traction motor for a predetermined duration to control the portion of the power dissipated by the DB grid to meet the magnitude of the one or more loads.

In another aspect, the disclosure relates to a locomotive. The locomotive includes at least traction motor, a dynamic brake (DB) grid, at least one chopper circuit, and a controller. The at least one traction motor is configured to power one or more loads during a braking of the locomotive. The dynamic brake (DB) grid includes at least one resistor bank, and is configured to dissipate at least a portion of the power generated by the at least one traction motor. The at least one chopper circuit includes a three-phase inverter module, and is configured to selectively disable an electrical communication between the at least one resistor bank of the DB grid and the at least one traction motor. The controller is coupled to the at least one chopper circuit and the one or more loads. The controller is configured to determine a magnitude of the one or more loads. The controller is further configured to control the at least one chopper circuit to disable the electrical communication between the at least one resistor bank of the DB grid and the at least one traction motor for a predetermined duration to control the portion of the power dissipated by the DB grid to meet the magnitude of the load.

In yet another aspect, the present disclosure is directed towards a method of controlling a power system for a locomotive during a braking of the locomotive. The locomotive includes at least one traction motor configured to power one or more loads during the braking of the locomotive. The locomotive further includes a dynamic brake (DB) grid configured to dissipate at least a portion of the power generated by the at least one traction motor. The method includes determining, by a controller, a magnitude of the one or more loads. The method further includes disabling, by at least one chopper circuit, an electrical communication between at least one resistor bank of the DB grid and the at least one traction motor for a predetermined duration to control the portion of the power dissipated by the DB grid to meet the magnitude of the load.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
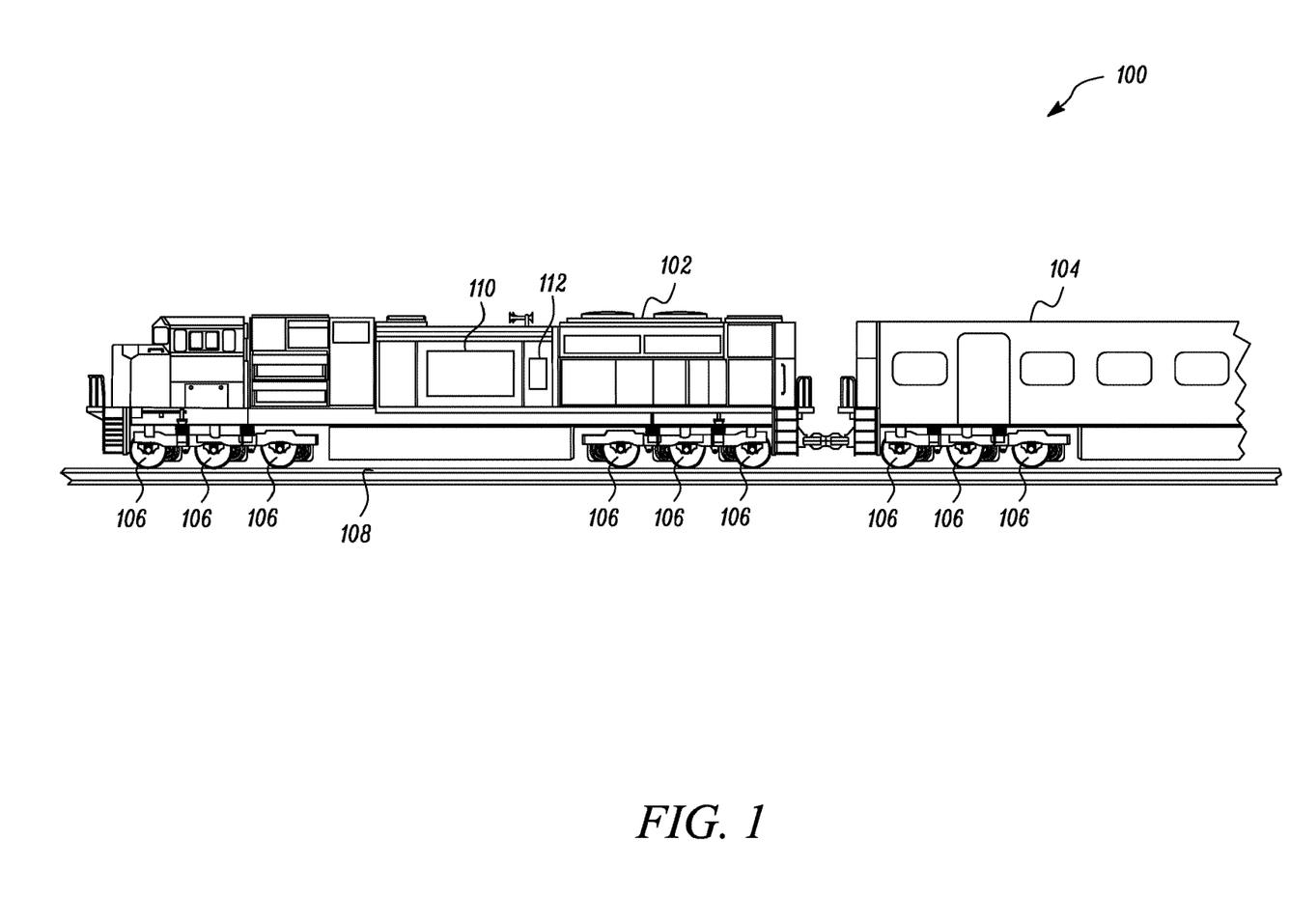
FIG. 1 is an exemplary locomotive, in accordance with an aspect of the present disclosure.

Referring to FIG. 1, a machine is illustrated. The machine may be an off-highway machine, such as including a locomotive system 100 (shown in FIG. 1). The locomotive system 100 includes a locomotive 102 and one or more railcars 104 coupled to the locomotive 102. The locomotive 102 and the railcars 104 may form a train. Although the locomotive 102 is shown to be coupled to one end of the train, it is possible that a similar locomotive be coupled to another end (not shown) of the train. Further, it is possible that the train includes a number of locomotives at either ends of the train. Other known arrangements of locomotives may also be contemplated. The railcars 104 may include passenger cars, freight cars, fuel tenders, etc., for carrying passengers, goods, or other loads. A number of wheel sets 106 are positioned throughout a length of the train in a known manner. The wheel sets 106 engage tracks 108 of an associated railroad, thus supporting and facilitating traversal of the train over the railroad.

Although the above discussion, aspects of the present disclosure may be applicable to various other machines and environments. Non-limiting examples of the machines, for both commercial and industrial purposes, may include diesel electric locomotives, diesel mechanical locomotives, steam locomotives, mining trucks, on-highway trucks, off-highway trucks, loaders, excavators, dozers, motor graders, tractors, trucks, backhoes, agricultural equipment, material handling equipment, marine vessels, and other machines that operate in a work environment. It is to be understood that the locomotive system 100 is shown primarily for illustrative purposes so as to assist in disclosing features and various embodiments of the present disclosure.

Figure 2:
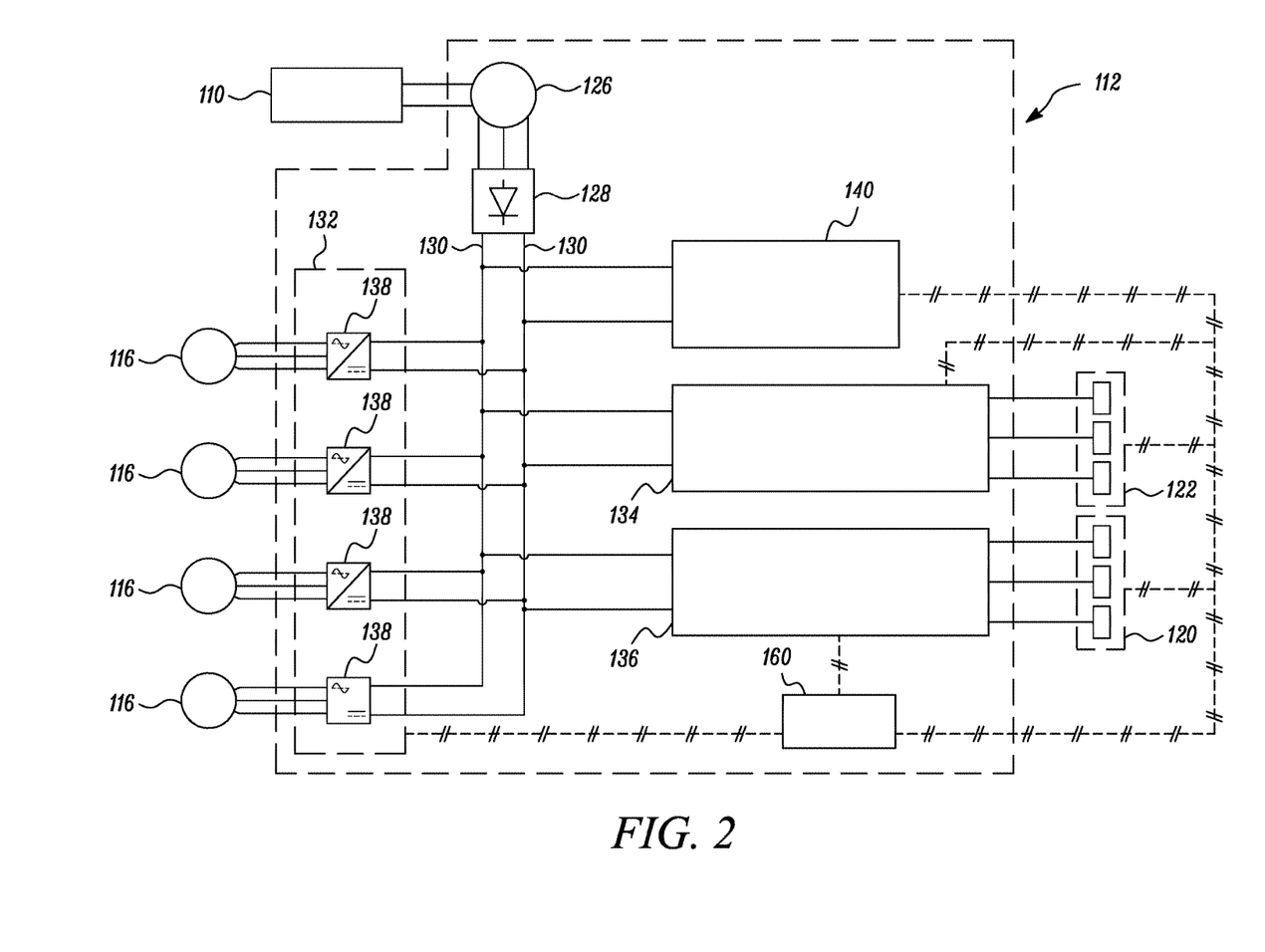
FIG. 2 is a schematic view depicting a power system of the locomotive, in accordance with an aspect of the present disclosure.

Referring to FIGS. 1 and 2, the locomotive 102 may include an internal combustion engine 110 (simply, engine 110) that facilitates a locomotion of the train over an expanse of the railroad. The locomotive 102 further includes a power system 112 (see also FIG. 2) that works in concert with the engine 110 to cater to various operational requirements, and particularly, with one or more loads, such as one or more of electrical loads of the locomotive 102 and/or the train, as will be discussed below.

Referring to FIGS. 1 and 2, the locomotive 102 further includes at least one traction motor 116 that is driven by the engine 110 and is configured to power the one or more loads during a braking of the locomotive 102. In the depicted embodiment, four traction motors 116 are shown, and the four traction motors 116 may drive four wheel sets 106 of the locomotive 102. Description pertaining to only one traction motor 116 may be discussed, and it may be understood that these discussions will be applicable to each of the traction motors 116. The traction motor 116 is configured to power the wheel sets 106 to move the train. Further, the traction motor 116 may act as a generator during a braking of the locomotive 102. Therefore, the traction motor 116 generates electrical power during the braking of the locomotive 102. At least a portion of the electrical power so generated may be transferred to the one or more loads of the locomotive system 100 through the power system 112. Further, some portion of the electrical power generated by the traction motor 116 may also be dissipated through the power system 112.

The engine 110 represents one of the commonly applied power generation units in locomotive systems. The engine 110 may be housed within an engine compartment of the engine assembly, as well known. The engine 110 may be powered by gaseous fuel, such as liquefied natural gas (LNG), propane gas, hydrogen gas, or any other suitable gaseous fuel, singularly or in combination with each other. Alternatively, the engine 110 may be based on a dual-fueled engine system, a diesel-fueled engine system, or a spark ignited engine system. The engine 110 may embody a V-type, an in-line, or any other configuration, as is conventionally known. The engine 110 may be a multi-cylinder engine, although aspects of the present disclosure are applicable to engines with a single cylinder as well. Further, the engine 110 may be one of a two-stroke engine, a four-stroke engine, or a six-stroke engine. Although these configurations are disclosed, aspects of the present disclosure need not be limited to any particular engine type.

Referring to FIG. 2, the power system 112 is shown. The power system 112 may be configured to distribute power to the loads and the traction motors 116 of the locomotive 102 and/or the railcars 104. The loads may include non-propulsion based loads. For example, the loads may include head end power (HEP) loads 120 of the railcars 104 and auxiliary power locomotive (APL) loads 122 of the locomotive 102.

The power system 112 may include various electrical and electronic units, such as logic devices, inverters, rectifiers, etc., that facilitate an operation of the power system 112. In detail, the power system 112 may include a traction alternator 126 operatively coupled to the engine 110. The traction alternator 126 may convert mechanical energy generated by the engine 110 into electrical energy in the form of alternating current (AC). At the output of the traction alternator 126, one or more rectifiers (see example traction rectifier 128) may convert AC to direct current (DC). DC is conveyed on a DC link 130. In one example, the traction alternator 126 may be configured to provide a minimum voltage of 2000 V on the DC link 130, based on a rotational speed of 1000 rpm of the engine 110. Other known configurations and specifications are possible. The power system 112 may further include a traction system 132 that facilitate a transfer of power between the DC link 130 and the traction motor 116. The power system 112 also includes an APL system 134 that facilitates a transfer of power from the DC link 130 to the APL loads 122, and an HEP system 136 that facilitates a transfer of power from the DC link 130 to the HEP loads 120. The power system 112 further includes a power dissipation system 140 that is connected to the DC link 130 to receive power generated by the traction motor 116 during a braking of the locomotive 102 to meet a magnitude of the loads 120, 122.

The traction system 132 may include, for example, one or more traction inverter modules 138 to convert DC received from the DC link 130 into AC so that the traction motor 116 may drive wheel sets 106 (FIG. 1) of the locomotive 102 upon a receipt of AC from the traction inverter modules 138 in a known manner. Also, the traction inverter modules 138 may convert AC received from the traction motors 116 into DC to provide DC to the DC link 130. In some implementations, the head end power (HEP) loads 120 and auxiliary power locomotive (APL) loads 122 may receive power (i.e. regenerative energy) from the traction motor 116 during a braking of the locomotive 102, and excess regenerative energy may be dumped into the power dissipation system 140. To enable such a transfer of power, the traction motors 116 are electrically coupled to the HEP loads 120, APL loads 122, and the power dissipation system 140 via the DC link 130. Further, the traction system 132 may also include various switches and/or other electrical components which help in controlling and transferring power between the DC link 130 and the traction motors 116.

The APL system 134 may be configured to facilitate transfer of power from the DC link 130 to the APL loads 122 to power the APL loads 122. The APL loads 122 may be non-propulsion loads of the locomotive 102. Examples of APL loads 122 may include blowers, cooling fans, compressors, pumps, power outlet systems, radiator fans, and various other loads. The APL system 134 may be configured to receive DC from the DC link 130, and may include an inverter modules (not shown) to convert DC into AC, which is then transferred to the APL loads 122. Moreover, the APL loads 122 may include various electrical components, such as, one or more rectifiers, auxiliary inverters, contactors, transformers, auxiliary power converters, switches, etc., that may facilitate power delivery from the DC link 130 in an acceptable form to the APL loads 122.

The HEP system 136 may be configured to facilitate transfer of power from the DC link 130 to the HEP loads 120 to power the HEP loads 120. To this end, the HEP system 136 may include a distribution network for the distribution of power to various HEP loads 120. In one example, the HEP system 136 may include a distribution network for 480 V 60 Hz passenger train line loads. In some implementations, the HEP system 136 may power various requirements pertaining to heating, cooling, ambient lighting, energizing electrical outlets, etc., of the railcars 104. The HEP system 136 may include a number of components, such as an HEP inverter system, HEP filters, and an HEP transformer (not shown). The HEP system 136 is configured to convert DC received from the DC link 130 into AC and provide AC to the HEP loads 120.

Further, the power system 112 includes a controller 160 that may be communicatively coupled to the power dissipation system 140, the APL system 134, and the HEP system 136. The controller 160 may also be in communication with the traction system 132, the DC link 130, the traction alternator 126, etc. The controller 160 is configured to control a magnitude of dissipation of a power generated by the traction motor 116 during a braking of the locomotive 102. The controller 160 controls the magnitude of dissipation of the power by controlling the power dissipation system 140 based on the one or more loads (APL loads and/or the HEP loads) connected to the DC link 130. For example, the controller 160 may be configured to determine a magnitude of load (i.e. the APL load 122 and the HEP load 120). For example, a magnitude of load may relate to a power required by the loads 120, 122. In some implementations, the controller 160 is configured to control a magnitude of dissipation of power by the power dissipation system 140 to maintain a voltage of the DC link 130 above a predetermined threshold. For example, the predetermined threshold may correspond to a minimum voltage of the DC link 130 by which a magnitude of the APL load 122 and the HEP load 120 may be sufficiently met.

To facilitate a control of such dissipation of power, the controller 160 may include power electronics, preprogrammed logic circuits, data processing circuits, associated input/output buses, volatile memory units, such as random access memory (RAM), etc., to help process signals or data received from the APL system 134 and/or the HEP system 136. For example, the controller 160 may be configured to receive signals from the APL system 134 and the HEP system 136 pertaining to the magnitude of the load connected to the DC link 130. Such signals may be processed by a processor of the controller 160, according to which the controller 160 may determine the magnitude of the APL loads 122 and the HEP load 120 (and determine a shortfall of power, if any), and then pass instructions to the power dissipation system 140 for regulating the power dissipation by the power dissipation system 140.

In some implementations, the controller 160 may be coupled to a variety of sensors, such as including current sensors (not shown) that help determine a magnitude of APL loads 122 and/or HEP loads 120. Further, the controller 160 may include a non-volatile memory that helps record values associates with such loads. The processor within the controller 160 may process and compare such loads against an availability of regenerative energy during a braking of the locomotive 102. Moreover, the non-volatile memory may store specifications of the APL and HEP systems 134, 136, and may further include a set of instructions that may be applied by the processor to process the data received pertaining to the APL loads 122 and HEP loads 120.

Controller 160 may be a microprocessor based device, or may be implemented as an application-specific integrated circuit, or other logic device, which provide controller functionality, and such devices being known to those with ordinary skill in the art. In some implementations, the controller 160 may form a portion of one of the engine's electronic control unit (ECU), such as a safety module or a dynamics module, or may be configured as a stand-alone entity. Further, the controller 160 may include an analog to digital converter (not shown) that may be configured to receive electrical signals of data from the APL system 134 and the HEP system 136 to convert the data and/or electrical signals from these systems into a feedback-specific format.

Figure 3:
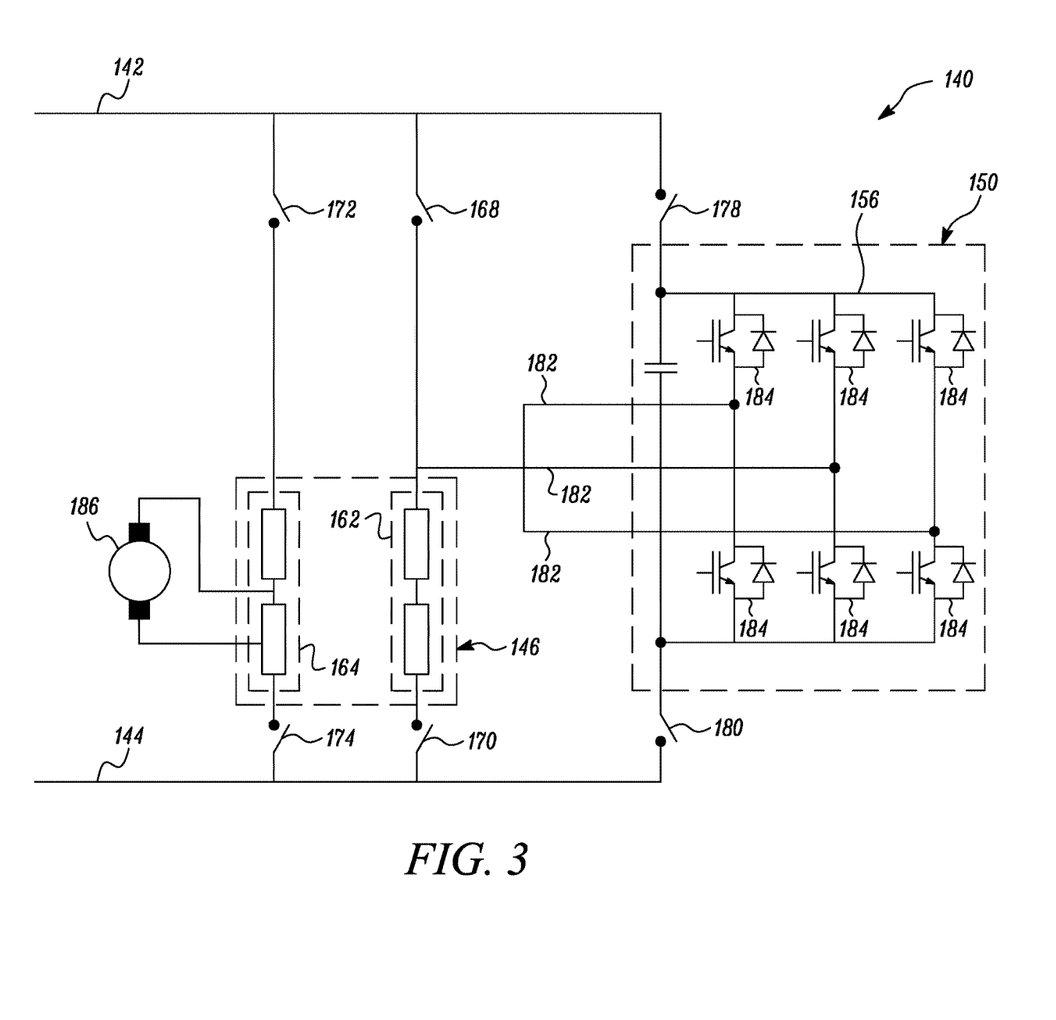
FIG. 3 is a power dissipation system of the power system including a single chopper circuit to regulate a power going through dynamic brake grid of the power system, in accordance with an aspect of the present disclosure.

Referring to FIG. 3, the power dissipation system 140 is discussed. The power dissipation system 140 is described in conjunction with FIG. 2. The power dissipation system 140 is in electrical communication with the DC link 130 and configured to receive power from the DC link 130 through a first power line 142 and a second power line 144. The power dissipation system 140 includes a dynamic brake (DB) grid 146 with at least one resistor bank, and a chopper system 150.

Figure 4:
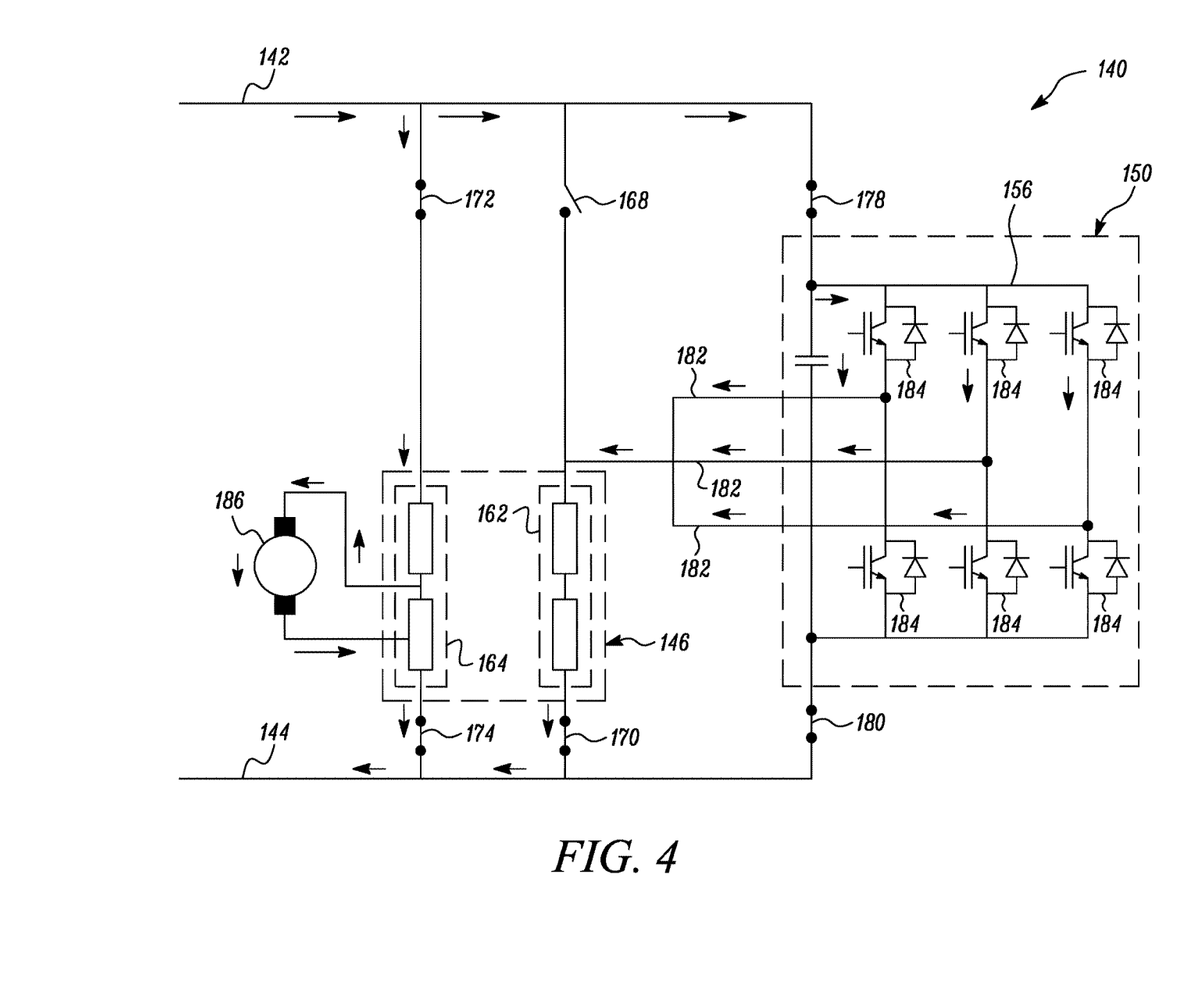
FIG. 4 depicts a configuration of the power dissipation system according to an operation of the power dissipation system, in accordance with an aspect of the present disclosure.
Figure 5:
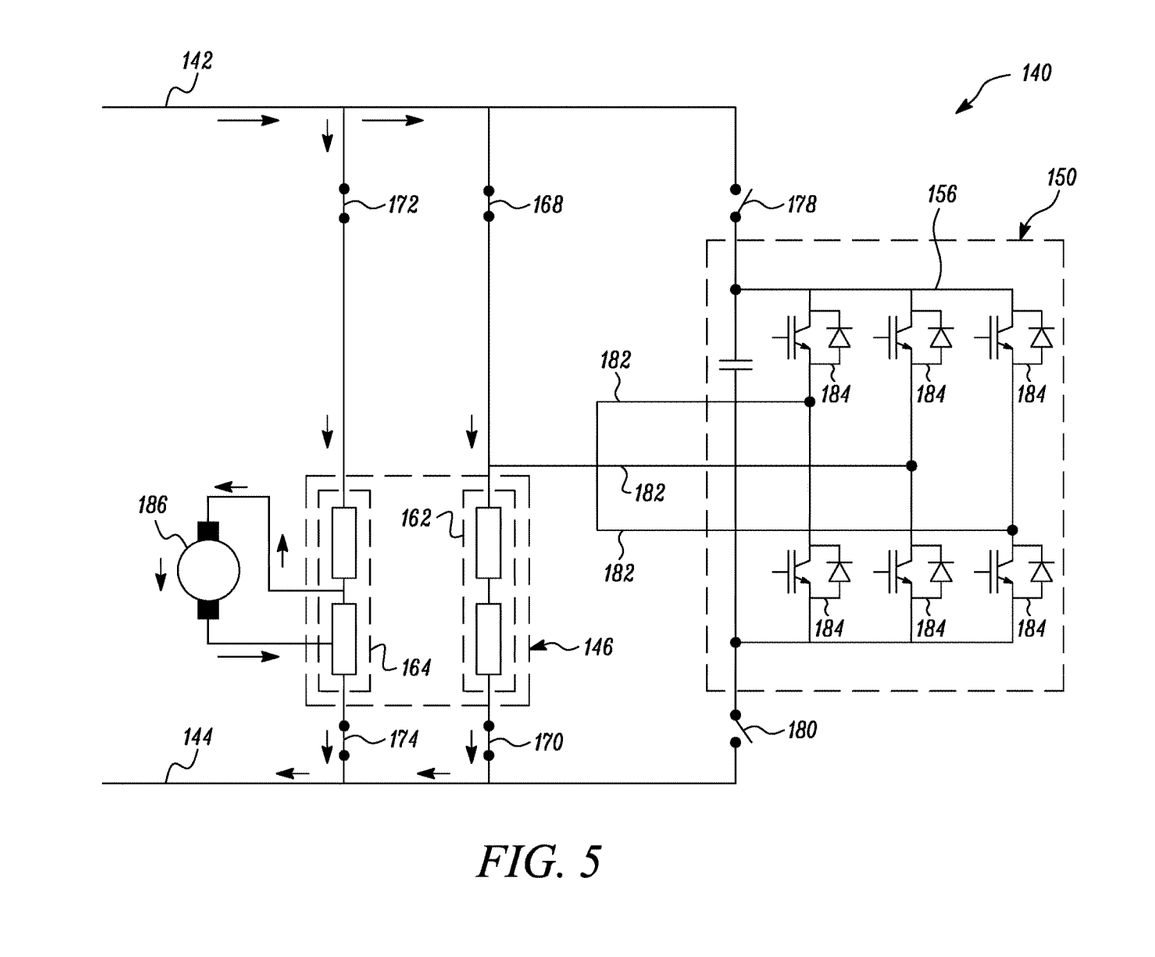
FIG. 5 depicts a configuration of the power dissipation system according to an operation of the power dissipation system, in accordance with an aspect of the present disclosure.

The DB grid 146 is configured to dissipate at least a portion of the power generated by the traction motors 116. For example, a dissipation of power (i.e. regenerative energy) may be in the form of heat to an ambient. The DB grid 146 may have an array or multiple banks of resistors. As shown in FIGS. 3, 4, and 5, the DB grid 146 has at least one resistor bank, for example, a first resistor bank 162 and a second resistor bank 164. The second resistor bank 164 is parallely connected to the first resistor bank 162. In some instances, each resistor bank 162, 164 may have a fixed resistance. For example, a value of resistance of each resistor bank may be 3Ω. Further, in an embodiment, the first resistor bank 162 and the second resistor bank 164 may have an equal value of resistance. In another embodiment, the first resistor bank 162 and the second resistor bank 164 may have a different value of resistance. The first resistor bank 162 and the second resistor bank 164 are electrically coupled to the DC link 130 through the first power line 142 and the second power line 144. The power dissipation system 140 may further include a grid blower 186 to cool the DB grid 146.

With continued reference to FIG. 3, further aspects of the power dissipation system 140 is discussed. Each of the first resistor bank 162 and the second resistor bank 164 represent one half of the DB grid 146. The first resistor bank 162 is switchably coupled to the first power line 142 by a first contactor 168, and to the second power line 144 by a second contactor 170. The second resistor bank 164 is switchably coupled to the first power line 142 by a third contactor 172, and to the second power line 144 by a fourth contactor 174. In some implementations, the contactors 168, 170, 172, 174 may switch between a closed state and an open state. In the closed state, the contactors 168, 170, 172, 174 may facilitate a flow of current from the first power line 142 to the second power line, while in the open state, the contactors 168, 170, 172, 174 may restrict a flow of current from the first power line 142 and the second power line 144. In an embodiment, the controller 160 may be coupled to each of the contactors 168, 170, 172, 174 to switch the contactors 168, 170, 172, 174 between the open state and the closed state.

Further, the chopper system 150 may be configured to regulate a magnitude of power dissipated through the DB grid 146. The chopper system 150 may control a magnitude of power that is dissipated into the DB grid 146 to maintain a minimum value of DC link voltage. In so doing, the chopper system 150 regulates a magnitude of the power dissipated through the DB grid 146 based on a power rating of the DB grid 146 (i.e. a power rating of one or more of the resistor banks 162, 164), and a magnitude of one or more loads (sum of APL and HEP loads 120, 122) connected to the power system 112. In an implementation, the chopper system 150 may include at least one chopper circuit that may be coupled with at least one resistor bank to control an amount of power that is dissipated into the associated resistor banks. For example, as shown in FIG. 3, the power dissipation system 140 includes a single chopper circuit 156 electrically coupled to the first resistor bank 162 to control a magnitude of power dissipated by the first resistor bank 162, and thus in turn controlling a magnitude of power dissipated by the DB grid 146.

The chopper circuit 156 may be electrically coupled to the first power line 142 by a first switchgear 178 and to the second power line 144 by a second switchgear 180. Further, chopper circuit 156 is also in electrical communication with the first resistor bank 162 through a three-phase output 182, as shown. As with an optional connection between the controller and the contactors 168, 170, 172, 174, the controller 160 may also be coupled to the switchgears 178, 180 so as to vary the switchgears 178, 180 between an open state and a closed state. In an embodiment, the contactors 168, 170, 172, 174 and the switchgears 178, 180 may be manually operated as well.

The chopper circuit 156 includes a three-phase inverter module including a plurality of semiconductor switches, as shown. For example, the semiconductor switches are in the form of insulated gate bipolar transistors (IGBTs) 184. As shown, the chopper circuit 156 includes six IGBTs 184, with three IGBTs 184 being coupled to a first (upper) branch and remaining three IGBTs 184 being coupled a second (lower) branch of the chopper circuit 156. A lesser or a higher number of IGBTs 184 are possible. The six IGBTs 184 allow an enhancement of the braking power handling capacity of the chopper circuit 156. In some implementations, either of the upper three IGBTs 184 or the lower three IGBTs 184 may be used to transmit power to the DB grid 146. The six IGBTs 184 may be configured to provide pulse width modulation. In some implementations, a disablement of the electrical connection between the first resistor bank 162 and the DC link 130, and thus the traction motors 116, is controlled by controlling the IGBTs 184.

In one embodiment, the controller 160 is configured to switch off the IGBTs 184 to disable an electrical communication between the first resistor bank 162 and the traction motors 116 for a predetermined duration within an interval—and for a remaining period of the interval, the controller 160 switches on the chopper circuit 156 for the regenerative energy to be dissipated into the DB grid 146. Such control may allow a passage of the regenerative energy from the traction motors 116 to the APL loads 122 and/or HEP loads 120 for the predetermined duration, facilitating a meeting of the magnitude of APL loads 122 and/or HEP loads 120 during the DB mode. In one example, the interval may be one second, although multiple other intervals are possible. In some implementations, the interval is based on a switching cycle of the chopper circuit 156, and although not limited, a switching cycle of the chopper circuit 156 may be 600 Hertz (Hz), for example. In some examples, the controller 160 may include a timer (not shown) to deduce the predetermined duration.

In an implementation, to facilitate a switching of the chopper circuit 156, the controller 160 may facilitate an application of voltage to the IGBTs 184, therefore changing the properties of the IGBTs 184, blocking, and/or creating electrically conductive paths through the IGBTs 184 for current to travel. A switched-on state of the IGBTs 184 may refer to a condition when a portion of power is passed to the DB grid 146 for dissipation, while a switched-off state of the IGBTs 184 may refer to a condition of increased resistance that helps divert the power to serve APL loads 122 and HEP loads 120. Further, an operation of the power dissipation system 140 has been depicted in FIG. 4, and has been discussed later in the application.

Principally, the controller 160 is configured to determine the predetermined duration relative to a switching of the IGBTs 184 by comparing the magnitude of the one or more loads (APL and/or HEP loads 120, 122) with a power rating of the associated resistor bank of the DB grid 146. For example, as shown in FIG. 3, the controller 160 determines the predetermined duration based on a power rating of the first resistor bank 162 of the DB grid 146. Details related to a calculation of the predetermined durations will be discussed later in the application.

Referring to FIG. 5, another exemplary state configuration of the chopper circuit 156 is shown. Notably, this configuration is shown to understand situations where the chopper circuit 156 need not be used by the power system, and it is required for the chopper circuit 156 to be electrically disconnected from the DB grid 146. For such a disconnection, both the first switchgear 178 and the second switchgear 180 need to be moved to the open position, as shown.

Figure 6:
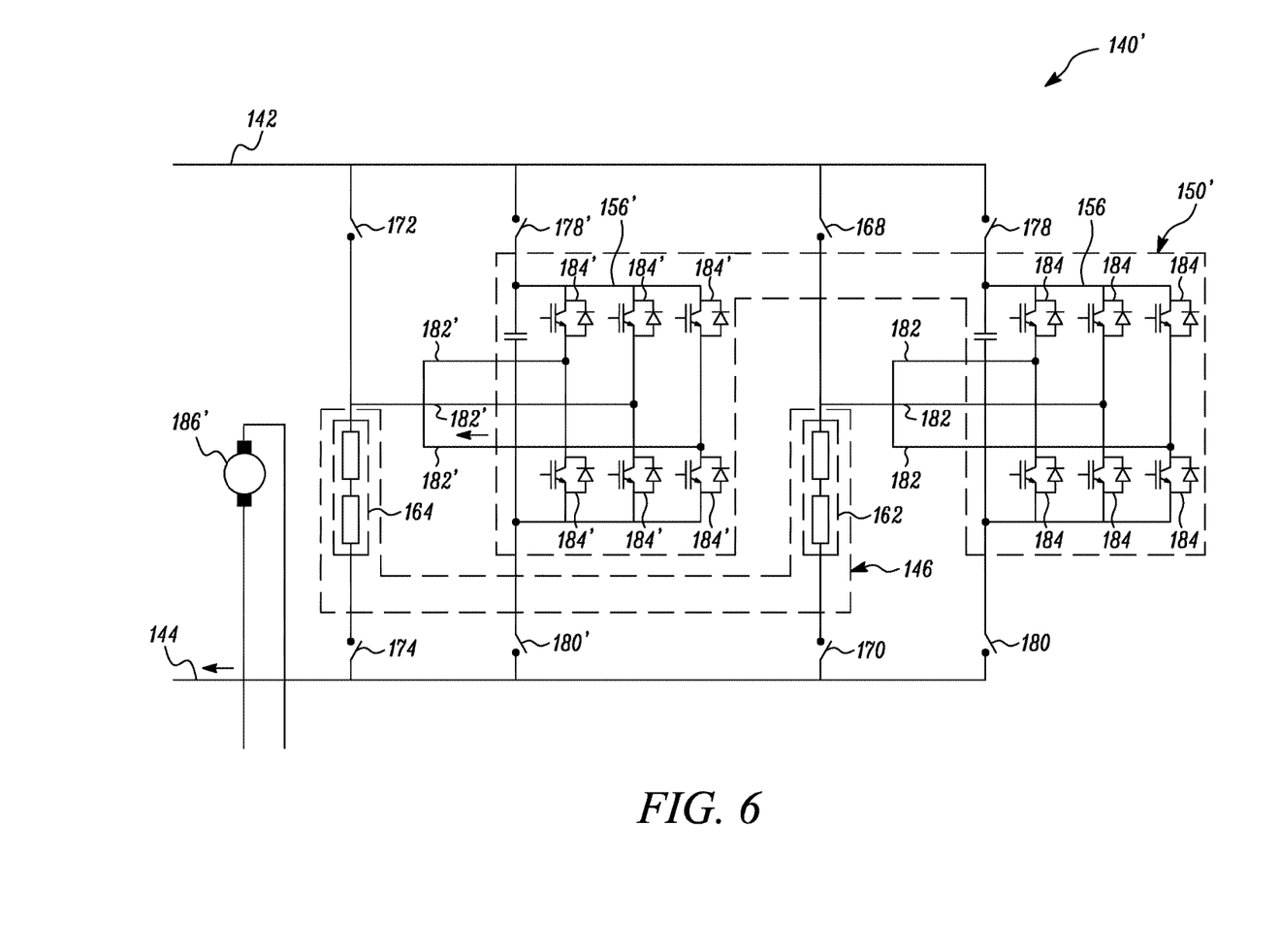
FIG. 6 is a power dissipation system of the power system including two chopper circuits to regulate a power going through dynamic brake grid of the power system, in accordance with an aspect of the present disclosure.

Referring to FIG. 6, a power dissipation system 140' is shown. The power dissipation system 140' is an embodiment of the power dissipation system 140 discussed above. The power dissipation system 140' may remain similar in form and function to the power dissipation system 140. However, according to the embodiment of the present disclosure, the power dissipation system 140' includes a chopper system 150' having a dedicated chopper circuit connected to each of the first resistor bank 162 and the second resistor bank 164. More particularly, the chopper system 150' includes two chopper circuits, namely the already described, chopper circuit 156 (referred to as the first chopper circuit 156 for this embodiment) and a second chopper circuit 156'. The second chopper circuit 156' is similar to the chopper circuit 156. In this embodiment, the first chopper circuit 156 is electrically coupled to the first resistor bank 162, while the second chopper circuit 156' is electrically coupled to the second resistor bank 164. In so doing, the chopper circuits 156, 156' may respectively and independently control a power dissipation through each of the first resistor bank 162 and the second resistor bank 164, thereby more effectively controlling a power dissipation by the DB grid 146. Further, the power dissipation system 140' may further include a grid blower 186' to cool the DB grid 146.

For the power dissipation system 140', the controller 160 may also independently determine the predetermined duration, within an interval, for the chopper circuit 156', since a power rating of the second resistor bank 164 may be different from the power rating of the first resistor bank 162. As a result, power though the first resistor bank 162 and the second resistor bank 164 may be regulated differently, in certain scenarios.

With continued reference to FIG. 6, and as with the embodiment of the power dissipation system 140, the first resistor bank 162 is switchably coupled to the first power line 142 by the first contactor 168 and to the second power line 144 by the second contactor 170. Similarly, the second resistor bank 164 is switchably coupled to the first power line 142 by the third contactor 172 and to the second power line 144 by the fourth contactor 174. In the depicted configuration of the embodiment, the first contactor 168 and the third contactor 172 may be open, while the second contactor 170 and the fourth contactor 174 may be closed. As with the embodiment of the power dissipation system 140, the first chopper circuit 156 may be switchably coupled to first power line 142 by the first switchgear 178 and to the second power line 144 by the second switchgear 180. Similarly, the second chopper circuit 156' may be switchably coupled to first power line 142 by a third switchgear 178' and to the second power line 144 by a fourth switchgear 180'. In the provided embodiment, each of the first switchgear 178, the second switchgear 180, the third switchgear 178', and the fourth switchgear 180' are in a closed state. An operation of the power dissipation system 140' has been depicted in FIG. 7, and has been discussed later in the application.

INDUSTRIAL APPLICABILITY

Referring to FIG. 4 an operational configuration of the power dissipation system 140 and a working, according to an aspect of the present disclosure, is shown. In this configuration, the first contactor 168 may be open, while each of the second contactor 170, the third contactor 172, and the fourth contactor 174, may be closed. Moreover, both the first switchgear 178 and the second switchgear 180 may be in a closed state as well. In such a configuration of the power dissipation system 140, as the chopper circuit 156 (i.e. the IGBTs 184) is energized or switched on by the controller 160, power may be passed from the first power line 142 to the chopper circuit 156, then regulated by the IGBTs 184 and dissipated further to the first resistor bank 162, and then passed to the second power line 144 through the second contactor 170, to maintain DC link voltage. Since the third contactor 172 and the fourth contactor 174 are in a closed state in this embodiment, a portion of the power from the DC link 130 also passes into the second resistor bank 164 and may be directly or fully dissipated into the second resistor bank 164 of the DB grid 146 as heat (i.e. without a regulation by the chopper circuit 156).

The controller 160 may be configured to control the chopper circuit 156 to control the power dissipation through the DB grid 146. Since the controller 160 may be in communication with the APL system 134 and/or the APL load 122 and the HEP system 136 and/or the HEP load 120, the controller 160 determines the magnitude of load connected to the DC link 130. Thereafter, the controller 160 compares the magnitude of the loads 120, 122 with the power rating of the DB grid 146 (or in this case the first resistor bank 162). In so doing, the controller 160 controls the chopper circuit 156 (for example, by controlling a switching of the IGBTs 184), thereby regulating a power dissipation into the first resistor bank 162, and transmitting a remaining portion of power to meet the loads 120, 122. Since a magnitude of loads may dynamically change, the controller 160 may alter a pattern of switching off and/or switching on of the IGBTs 184, in turn varying a portion of regenerative energy that may be dumped to the DB grid 146 as waste energy, and a portion of regenerative energy that may be supplied to meet the APL loads 122 and/or and HEP loads 120. In some implementations, the controller 160 may regulate power dissipation into the first resistor bank 162, disabling an electrical communication between the traction motors 116 and the first resistor bank 162 for a predetermined duration.

A calculation of the predetermined duration for which the chopper circuit 156 is switched to the off state (or to the on state) within an interval, will now be discussed. This discussion relates to an operation of the power dissipation system 140. It may be noted that the calculations are disclosed for an ease in understanding of a determination of a duty cycle of the chopper circuit 156, and thus, the values used for such a calculation are purely exemplary in nature.

In one exemplary operational scenario, the first resistor bank 162 may be rated at 1400 Kilowatts (kW), while a combined HEP and APL loads 120, 122 may total 600 kW. While calculating the combined HEP and APL loads 120, 122, the controller 160 may take into account losses in the HEP and APL system 134, 136. The controller 160 calculates a ratio of the combined HEP loads and APL loads 120, 122 and the power rating of the first resistor bank 162 to determine the predetermined duration for which the chopper circuit 156 is switched off. In this example, the ratio is 0.43 which is, obtained by:

$$600 \text{ kW}/1400 \text{ kW}$$

Based on the ratio, the controller 160 determines that a percentage of time in an interval for which the chopper circuit 156 is switched off. As in the example, the ratio is 0.43, the chopper circuit is switched off for 43% time of the interval. In an exemplary scenario, the interval is one second, and in such a case, the predetermined duration is 0.43 sec for which the chopper circuit 156 is switched off. As the chopper circuit 156 is switched off for 0.43 sec and switched on for remaining period of the interval (i.e. 0.57 sec), the first resistor bank 162 dissipates power only during the 0.57 seconds. Therefore, the predetermined duration may be determined as a quantity of time within the one second, and which may be based on the calculated percentage load (i.e. 43%). In this manner, the controller 160 controls/reduces the power dissipated by the DB grid 146 in accordance with the magnitude of the loads 120, 122 connected with the DC link 130 during braking of the locomotive 102.

Further, by controlling the power dissipated by the DB grid 146 during braking of the locomotive 102, the controller 160 maintains a voltage of the DC link 130 above the predetermined threshold. By maintaining the voltage of the DC link 130 above the predetermined threshold (minimum required for the APL and HEP systems) during braking of the locomotive 102, the controller 160 prevents a reduction in a torque (power) of the traction motor 116 below a minimum threshold value. In this manner, during braking of the locomotive 102, a transfer of power from the engine 110 to the DC link 130 is prevented, and thereby a fuel consumption of the engine 110 is reduced.

Figure 7:
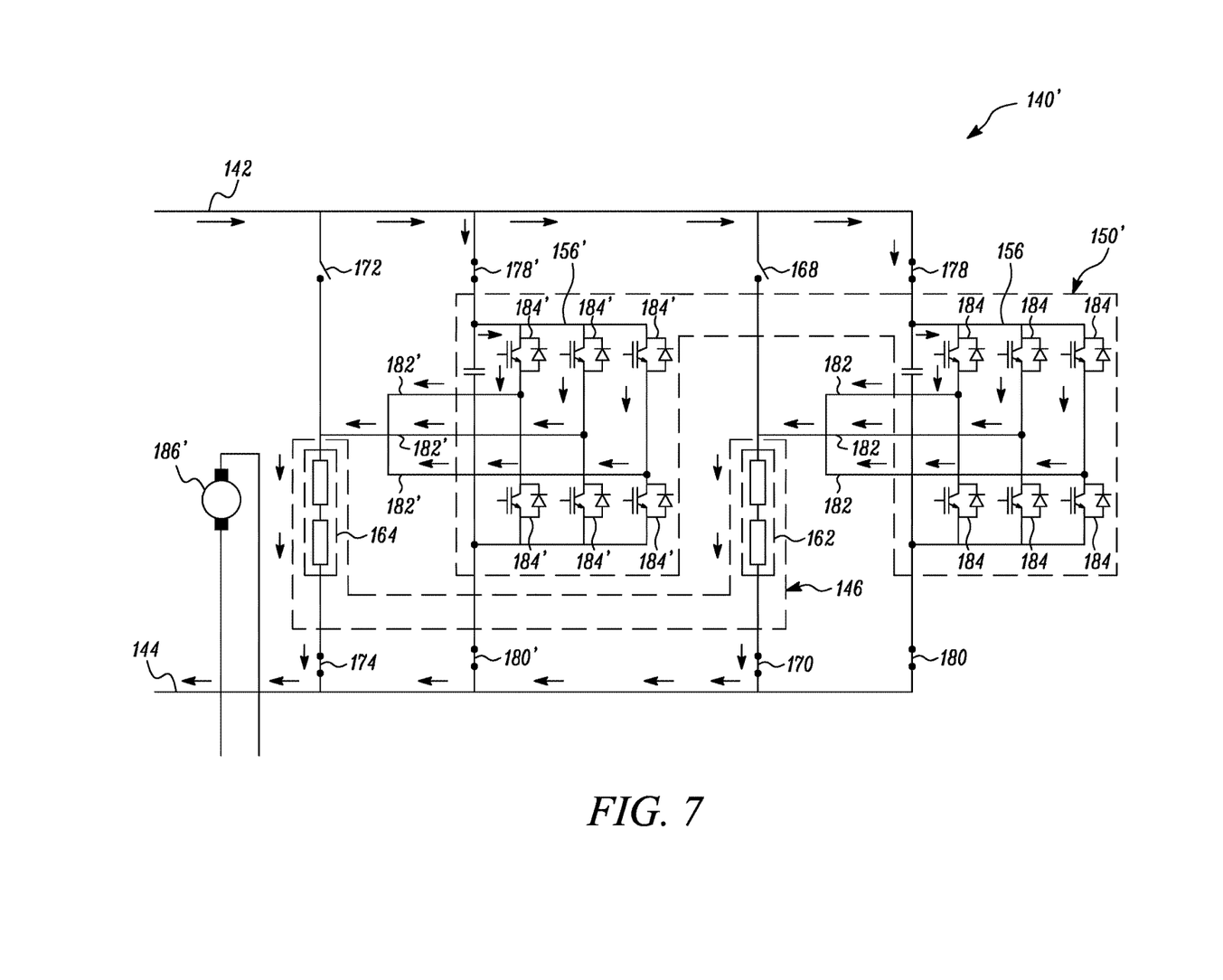
FIG. 7 depicts a configuration of the power dissipation system of FIG. 6 according to an operation of the power dissipation system of FIG. 6, in accordance with an aspect of the present disclosure.

Referring to FIG. 7, an operational configuration of the power dissipation system 140' and a working, according to an aspect of the present disclosure, is shown. In this configuration of the power dissipation system 140', the first contactor 168 is kept open while the first switchgear 178, the second switchgear 180, and the second contactor 170 are closed. In doing so, an electrical communication of the DC link 130 to the first resistor bank 162 though the first chopper circuit 156 (i.e. the IGBTs 184) is enabled. The controller 160 controls the switching of the IGBTs 184 to enable or disable electrical communication between the DC link 130 (traction motor 116) and the first resistor bank 162. In this manner, the controller 160 controls a portion of the power dissipated by the first resistor bank 162. Further, the third contactor 172 is kept open while the third switchgear 178', the fourth switchgear 180', and the fourth contactor 174 are close. In this manner, an electrical communication of the DC link 130 to the second resistor bank 164 though the second chopper circuit 156' (i.e. the IGBTs 184') is enabled. The controller 160 controls the switching of the IGBTs 184' to enable or disable electrical communication between the DC link 130 (traction motor 116) and the second resistor bank 164. In this manner, the controller 160 controls a portion of the power dissipated by the second resistor bank 164. Since both the first resistor bank 162 and the second resistor bank 164 are in respective electrical communication with the first chopper circuit 156 and the second chopper circuit 156', a power dissipation through the first resistor bank 162 and the second resistor bank are regulated by the chopper circuits 156, 156'. The controller 160 may regulate amount of power dissipation into each resistor banks 162, 164 by disabling an electrical communication between the traction motors 116 and the resistor banks 162, 164 for a predetermined duration. Although the configurations shown, it may be understood that in various designs, configurations, and applications, there may be a multiple resistor banks applied, and it is possible that for each of those multiple resistor banks, multiple chopper circuits, such as the chopper circuits 156, 156' may be respectively applied.

A calculation of the predetermined duration for which the chopper circuit 156, 156' is switched to the off state (or to the on state) within an interval, will now be discussed. This discussion relates to an operation of the power dissipation system 140'. It may be noted that the calculations are disclosed for an ease in understanding of a determination of a duty cycle of the chopper circuit 156, 156' and thus, the values used for such a calculation are purely exemplary in nature.

In one exemplary operational scenario, the first resistor bank 162 may be rated at 1400 Kilowatts (kW) and the second resistor bank 164 at 1400 kW as well, while a combined HEP and APL loads 120, 122 may total 600 kW. While calculating the combined HEP and APL loads 120, 122, the controller 160 may take into account losses in the HEP and APL system 134, 136. The controller 160 calculates a ratio of the combined HEP loads and APL loads 120, 122 and the power ratings of the resistor banks 162, 164 to determine the predetermined duration for which the respective chopper circuits 156, 156' is switched off. In this example, the ratio is 0.21 for each of the chopper circuits 156, 156', which is, obtained by:

$$600 \text{ kW}/(1400+1400) \text{ kW}$$

Based on this ratio, the controller 160 determines that a percentage of time in an interval for which each of the chopper circuits 156, 156' is switched off. As in the example, the ratio is 0.21, the chopper circuits 156, 156' are switched off for 21% time of the interval. In an exemplary scenario, the interval is one second, and in such a case, the predetermined duration is 0.21 sec for which each of the chopper circuits 156, 156' is switched off. As the chopper circuits 156, 156' are switched off for 0.21 sec and switched on for remaining period of the interval (i.e. 0.79 sec), the first resistor bank 162 dissipates power only during the 0.79 seconds. Therefore, the predetermined duration may be determined as a quantity of time within the one second, and which may be based on the calculated percentage load (i.e. 21%). In this manner, the controller 160 controls/reduces the power dissipated by the DB grid 146 (first resistor bank 162 and the second resistor bank 164) in accordance with the magnitude of the loads 120, 122 connected with the DC link 130 during braking of the locomotive 102.

In certain implementations, the controller 160 may divide the load (APL load 122+HEP load 120) connected with DC link 130 into number of portions equal to the number of chopper circuits in the power dissipation system. For example, in the illustrated embodiment of FIGS. 6 and 7, the controller 160 may divide the load connected to the DC link 130 into two portions (first portion and second portion). Thereafter, the controller 160 may calculate the predetermined duration for first chopper circuit 156 based on ratio of first portion of the load and the power rating of the first resistor banks 162. Similarly, the controller 160 may calculate the predetermined duration for second chopper circuit 156' based on ratio of second portion of the load and the power rating of the second resistor bank 164. The controller 160 may disable the electrical communication between the DC link 130 (traction motor 116) and resistor banks 162, 164 based on the respective predetermined durations to control the power dissipation by the DB grid 146 during braking of the locomotive 102.

Thus, by controlling the power dissipated by the DB grid 146 during braking of the locomotive 102, the controller 160 maintains a voltage of the DC link 130 above the predetermined threshold. By maintaining the voltage of the DC link 130 above the predetermined threshold (minimum required for the APL and HEP systems) during braking of the locomotive 102, the controller 160 prevents a reduction in a torque (power) of the traction motor 116 below a minimum threshold value. In this manner, during braking of the locomotive 102, a transfer of power from the engine 110 to the DC link 130 is prevented, and thereby a fuel consumption of the engine 110 is reduced.

As the magnitude of the load connected with the DC link may vary, the controller 160 accordingly controls the power dissipation through the power dissipation system 140, 140' to maintain the voltage of the DC link 130 above the predetermined threshold.

Figure 8:
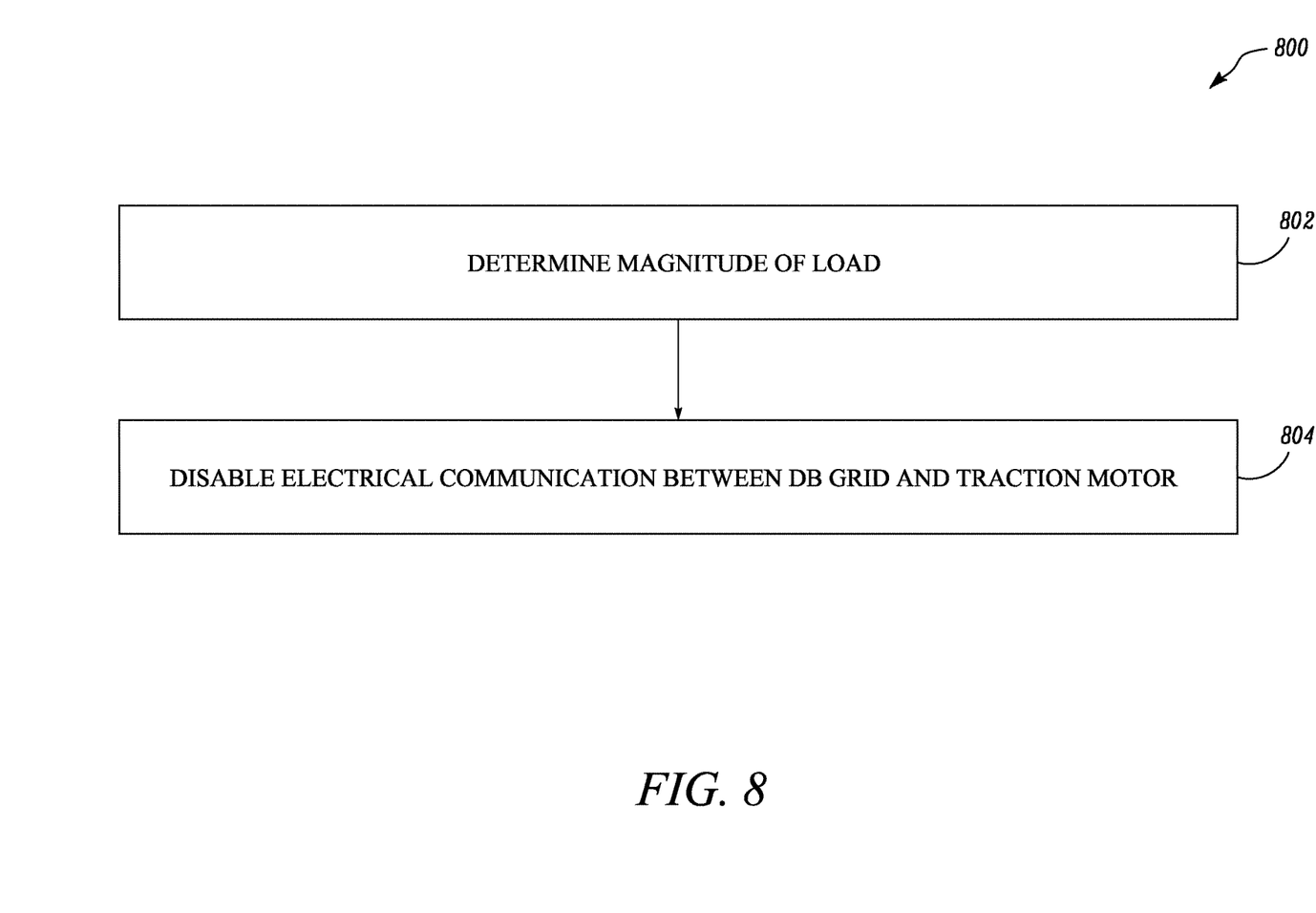
FIG. 8 depicts an exemplary method of controlling the power system, in accordance with an aspect of the present disclosure.

Referring to FIG. 8, an exemplary method for controlling the power system 112 is discussed. The method has been discussed by way of a flowchart 800 and is described in conjunction with FIGS. 1-7. The method starts at step 802.

At step 802, the controller 160 determines a magnitude of the one or more loads 120, 122. For example, a magnitude of loads 120, 122 may be determined with help of a current sensor that may be suitably placed in the APL and the HEP systems 134, 136, facilitate a detection of the loads 120, 122, during dynamic braking of the locomotive 102. The method proceeds to step 804.

At step 804, the controller 160 disables an electrical communication between at least one resistor banks 162, 164 and the traction motor 116 for a predetermined duration to control a portion of the power, generated by the traction motor during braking of the locomotive, dissipated by the DB grid 146 to meet the magnitude of the loads 120, 122. The disablement is facilitated by use of the at least one chopper circuits, as aforementioned.

As disclosed above, the controller 160 determines the predetermined duration by comparing the magnitude of the one or more loads 120, 122 with a power rating of the at least one of the resistor banks 162, 164. The electrical communication between the at least one of the resistor banks 162, 164 and the traction motor 116 is disabled by the controller 160 for the predetermined duration during every interval. In one implementation, a ratio between the predetermined duration and a corresponding interval is directly proportional to a ratio between the magnitude of the one or more loads and the power rating of at least one of the resistor banks 162, 164.

In brevity, the chopper circuits may facilitate a selective and adaptive disablement of an electrical communication between the at least one of the resistor banks 162, 164 and the traction motor 116. This allows a maintenance of the voltage of the DC link 130 while meeting a power requirement of the one or more loads (APL loads 122 and HEP load 120) from the power generated by traction motor 116 during a braking of the locomotive 102. As a result, a requirement to have the engine 110 provide power to the DC link 130 to maintain torque (power) of the traction motor 116 during braking of the locomotive 102 is prevented, thereby reducing fuel consumption of the locomotive 102.

It should be understood that the above description is intended for illustrative purposes only and is not intended to limit the scope of the present disclosure. Thus, one skilled in the art will appreciate that other aspects of the disclosure may be obtained from a study of the drawings, the disclosure, and the appended claim.

What is claimed is:

1. A power system for a locomotive, the locomotive including at least one traction motor configured to power one or more loads during a braking of the locomotive, the power system comprising:
   a dynamic brake (DB) grid including at least one resistor bank and configured to dissipate at least a portion of the power generated by the at least one traction motor;
   at least one chopper circuit including a three-phase inverter module, the at least one chopper circuit configured to selectively disable an electrical communication between the at least one resistor bank and the at least one traction motor, wherein the at least one chopper circuit includes a plurality of insulated gate bipolar transistors (IGBTs), wherein the plurality of IGBTs are controlled by the controller to disable the electrical communication between the at least one resistor bank and the at least one traction motor; and
   a controller coupled to the at least one chopper circuit and the one or more loads, the controller configured to:
   determine a magnitude of the one or more loads; and
   control the at least one chopper circuit to disable the electrical communication between the at least one resistor bank and the at least one traction motor for a predetermined duration to control the portion of the power dissipated by the DB grid to meet the magnitude of the one or more loads.

2. The power system of claim 1, wherein the controller is configured to determine the predetermined duration by comparing the magnitude of the one or more loads with a power rating of the at least one resistor bank.

3. The power system of claim 1, wherein the electrical communication between the at least one resistor bank and the at least one traction motor is disabled by the controller for one or more intervals, wherein the predetermined duration is determined for every interval.

4. The power system of claim 3, wherein a ratio between the predetermined duration and a corresponding interval is directly proportional to a ratio between the magnitude of the one or more loads and a power rating of the at least one resistor bank.

5. The power system of claim 1, wherein the controller controls the portion of the power dissipated by the DB grid to maintain a voltage of a DC link of the power system above a predetermined threshold.

6. The power system of claim 1, wherein the one or more loads include loads associated with an auxiliary power system of the locomotive, and loads associated with a head end power system of one or more railcars of the locomotive.

7. The power system of claim 1, wherein the at least one chopper circuit is a first chopper circuit and the DB grid includes a first resistor bank and a second resistor bank, the power system further including a second chopper circuit, wherein
   the first chopper circuit is configured to disable an electrical communication between the first resistor bank and the at least one traction motor, and
   the second chopper circuit is configured to disable an electrical communication between the second resistor bank and the at least one traction motor.

8. A locomotive comprising:
   at least one traction motor configured to power one or more loads during a braking of the locomotive;
   a dynamic brake (DB) grid including at least one resistor bank and configured to dissipate at least a portion of the power generated by the at least one traction motor;
   at least one chopper circuit including a three-phase inverter module, the at least one chopper circuit configured to selectively disable an electrical communication between the at least one resistor bank of the DB grid and the at least one traction motor, wherein the at least one chopper circuit includes a plurality of insulated gate bipolar transistors (IGBTs), wherein the plurality of IGBTs are controlled by the controller to disable the electrical communication between the at least one resistor bank of the DB grid and the at least one traction motor; and
   a controller coupled to the at least one chopper circuit and the one or more loads, the controller configured to:
   determine a magnitude of the one or more loads; and
   control the at least one chopper circuit to disable the electrical communication between the at least one resistor bank of the DB grid and the at least one traction motor for a predetermined duration to control the portion of the power dissipated by the DB grid to meet the magnitude of the one or more loads.

9. The locomotive of claim 8, wherein the controller is configured to determine the predetermined duration by comparing the magnitude of the one or more loads with a power rating of the at least one resistor bank of the DB grid.

10. The locomotive of claim 8, wherein the electrical communication between the at least one resistor bank of the DB grid and the at least one traction motor is disabled by the controller for one or more intervals, wherein the predetermined duration is determined for every interval.

11. The locomotive of claim 10, wherein a ratio between the predetermined duration and a corresponding interval is directly proportional to a ratio between the magnitude of the one or more loads and a power rating of the at least one resistor bank of the DB grid.

12. The locomotive of claim 8, wherein the one or more loads include loads associated with an auxiliary power system of the locomotive, and loads associated with a head end power system of one or more railcars of the locomotive.

13. The locomotive of claim 8, wherein the at least one chopper circuit is a first chopper circuit and the DB grid includes a first resistor bank and a second resistor bank, the power system further including a second chopper circuit, wherein
the first chopper circuit is configured to disable an electrical communication between the first resistor bank and the at least one traction motor, and
the second chopper circuit is configured to disable an electrical communication between the second resistor bank and the at least one traction motor.

14. A method of controlling a power system for a locomotive during a braking of the locomotive, the locomotive including at least one traction motor configured to power one or more loads during the braking of the locomotive, and a dynamic brake (DB) grid configured to dissipate at least a portion of the power generated by the at least one traction motor, the method comprising:

determining, by a controller, a magnitude of the one or more loads; and disabling, by at least one chopper circuit, an electrical communication between at least one resistor bank of the DB grid and the at least one traction motor for a predetermined duration to control the portion of the power dissipated by the DB grid to meet the magnitude of the one or more loads, wherein the at least one chopper circuit includes a plurality of insulated gate bipolar transistors (IGBTs), wherein the plurality of IGBTs are controlled by the controller to disable the electrical communication between the at least one resistor bank of the DB grid and the at least one traction motor.

15. The method of claim 14 further comprising determining, by the controller, the predetermined duration by comparing the magnitude of the one or more loads with a power rating of the at least one resistor bank of the DB grid.

16. The method of claim 14, wherein the electrical communication between the between the at least one resistor bank of the DB grid and the at least one traction motor is disabled by the controller for one or more intervals, wherein the predetermined duration is determined for every interval.

17. The method of claim 16, wherein a ratio between the predetermined duration and a corresponding interval is directly proportional to a ratio between the magnitude of the one or more loads and a power rating of the at least one resistor bank of the DB grid.

18. The method of claim 14, wherein the portion of the power dissipated by the DB grid is controlled to maintain a voltage of a DC link above a predetermined threshold.

* * * * *